(No Model.)

W. H. BERGER.
HANDLE.

No. 368,053. Patented Aug. 9, 1887.

WITNESSES

INVENTOR
William H. Berger
By Connolly Bros
Attys

UNITED STATES PATENT OFFICE.

WILLIAM H. BERGER, OF PHILADELPHIA, PENNSYLVANIA.

HANDLE.

SPECIFICATION forming part of Letters Patent No. 368,053, dated August 9, 1887.

Application filed February 17, 1887. Serial No. 227,953. (No model.)

*To all whom it may concern:*

Be it known that I, WILLIAM H. BERGER, a citizen of the United States, residing at Philadelphia, in the county of Philadelphia and State of Pennsylvania, have invented certain new and useful Improvements in Handles for Milk-Cans, &c.; and I do hereby declare the following to be a full, clear, and exact description of the invention, reference being had to the accompanying drawings, which form part of this specification.

This invention has relation to handles of milk-cans and similar metallic vessels, and has for its object the provision of a cushion to the handle which will prevent the body of the can from being battered or indented, and will also prevent the rattling and noise incident to the movement and transportation of the vessel.

My invention consists in providing that portion of a pivoted handle which is grasped and which falls and lies against the wall of the can with a strip or band of india-rubber or its equivalent, which, being laced through holes or perforations and suitably fastened at the ends, will present a soft yielding contact-surface and effectually prevent the impact of the metallic portion of the handle with the surface of the can.

Figure 1:
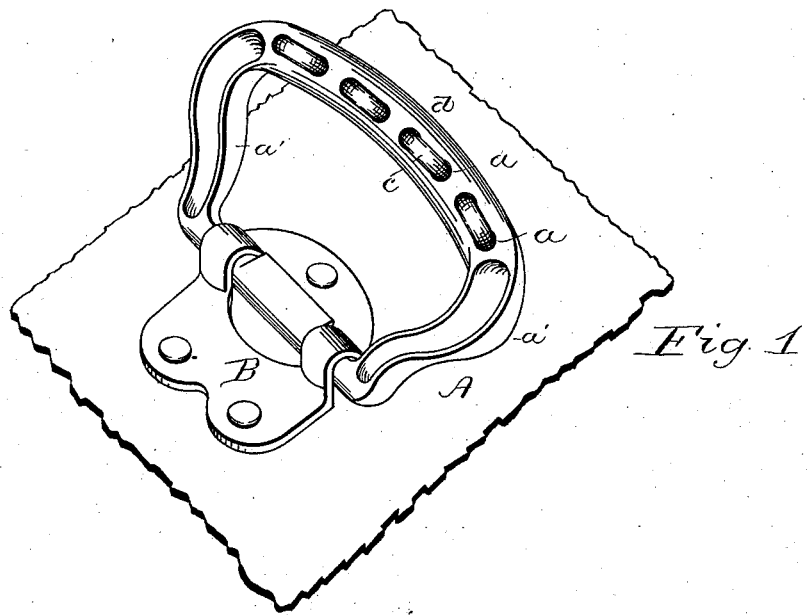
Figure 2:
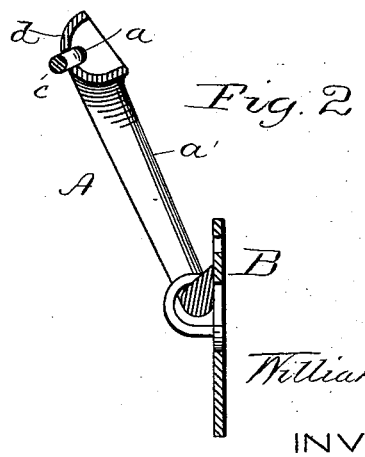

In the accompanying drawings, Figure 1 is a perspective view of a handle provided with my improvement. Fig. 2 is a transverse sectional view of the same.

The handle A is of the usual form, and is attached to the can by means of the ear B. Handles for milk-cans are usually made with a single hole or perforation on one side to receive a block or cushion of rubber. For the purposes of my invention I provide a series of holes, $a$, through that part of the handle which is grasped by the hand and lace through them a strip, $c$, preferably of india-rubber, which, being knotted at the ends or otherwise fastened, will remain in place, covering the alternate metallic portions between the holes and preventing the metal from coming in contact with the body of the can.

For the purposes of convenience, lightness, and economy, I make the handle hollow or concave, the concavity of the arms $a'$ being on the under side and that of the portion $d$ on the outer side. The convex surface of the arms afford space for ornamentation, while the thinning of the metal of the part $d$ allows the holes to be readily formed and the lacing to be easily effected.

What I claim as my invention is as follows:

The combination, with the handle A, having perforations $a$, of the cushioning-strip $c$, laced through the latter, substantially as described.

In testimony that I claim the foregoing I have hereunto set my hand this 16th day of February, 1887.

WILLIAM H. BERGER.

Witnesses:
WILL H. POWELL,
R. DALE SPARHAWK.